United States Patent
Miersch-Wiemers et al.

(10) Patent No.: US 9,340,197 B1
(45) Date of Patent: May 17, 2016

(54) VEHICLE AND METHOD OF CONTROLLING

(71) Applicant: ROBERT BOSCH GMBH, Stuttgart (DE)

(72) Inventors: Oliver Miersch-Wiemers, Ann Arbor, MI (US); Jason Schwanke, Southfield, MI (US); Li Jiang, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/604,357

(22) Filed: Jan. 23, 2015

(51) Int. Cl.
G05D 1/00 (2006.01)
B60W 20/00 (2016.01)
B60L 15/20 (2006.01)

(52) U.S. Cl.
CPC ............... B60W 20/00 (2013.01); B60L 15/20 (2013.01); *Y10S 903/906* (2013.01)

(58) Field of Classification Search
CPC ............................... B60W 20/00; B60L 15/20
See application file for complete search history.

(56) References Cited

U.S. PATENT DOCUMENTS

| | | | |
|---|---|---|---|
| 4,453,485 A | 6/1984 | Houghton-Brown | |
| 6,226,570 B1 | 5/2001 | Hahn | |
| 6,695,085 B2 | 2/2004 | Mackle | |
| 6,801,125 B1 | 10/2004 | McGregor | |
| 8,308,182 B2 * | 11/2012 | Ortmann | B60D 1/36 280/477 |
| 2002/0157889 A1* | 10/2002 | Mackle | B62D 15/027 180/204 |
| 2004/0211605 A1* | 10/2004 | Botti | B60K 6/32 180/65.25 |
| 2005/0261816 A1* | 11/2005 | DiCroce | B60R 25/00 701/36 |
| 2007/0102930 A1* | 5/2007 | Koike | B60W 30/192 290/18 |
| 2008/0033603 A1* | 2/2008 | Gensler | B62D 15/0285 701/1 |
| 2008/0117079 A1* | 5/2008 | Hassan | B60R 25/045 340/901 |
| 2008/0169144 A1* | 7/2008 | DeGrave | B60L 7/08 180/165 |
| 2009/0271057 A1* | 10/2009 | Stone | B60K 6/24 701/22 |

(Continued)

FOREIGN PATENT DOCUMENTS

| | | |
|---|---|---|
| CN | 201876985 | 6/2011 |
| DE | 10346888 | 5/2005 |

(Continued)

OTHER PUBLICATIONS

International Search Report and Written Opinion for Application No. PCT/EP2015/079103 dated Mar. 7, 2016 (12 pages).

*Primary Examiner* — Calvin Cheung
(74) *Attorney, Agent, or Firm* — Michael Best & Friedrich LLP

(57) ABSTRACT

A method for controlling a mild hybrid vehicle with an electric motor is provided. The electric motor is arranged to selectively output torque and to selectively operate as a generator to harvest electrical power during operation of an internal combustion engine of the mild hybrid vehicle. An interface is provided in a location accessible outside of the vehicle. The interface is configured to control non-driving movement of the mild hybrid vehicle. An input is received from a human operator via the interface. In response to the input, the vehicle moves solely under power of the electric motor of the mild hybrid vehicle.

18 Claims, 3 Drawing Sheets

(56) References Cited

U.S. PATENT DOCUMENTS

| | | | |
|---|---|---|---|
| 2011/0313594 A1* | 12/2011 | Kato | G07C 5/008 701/2 |
| 2012/0101660 A1* | 4/2012 | Hattori | G05D 1/0022 701/2 |
| 2012/0316704 A1* | 12/2012 | Ohbayashi | B60R 25/04 701/2 |
| 2013/0006472 A1* | 1/2013 | McClain | B62D 13/06 701/41 |
| 2013/0024049 A1* | 1/2013 | Yoshioka | B62D 1/00 701/2 |
| 2013/0268140 A1* | 10/2013 | Du | G08C 17/02 701/2 |
| 2013/0268141 A1 | 10/2013 | Du | |
| 2013/0311004 A1* | 11/2013 | Okamura | G05D 1/0033 701/2 |
| 2013/0345903 A1* | 12/2013 | Nakagawa | G07C 5/008 701/2 |
| 2014/0012465 A1* | 1/2014 | Shank | B62D 15/0285 701/36 |
| 2014/0067163 A2 | 3/2014 | Du | |
| 2014/0222252 A1* | 8/2014 | Matters | B62D 15/027 701/2 |
| 2014/0244073 A1* | 8/2014 | Okamura | B62D 15/0285 701/2 |
| 2014/0365032 A1* | 12/2014 | Park | B62D 15/027 701/2 |
| 2014/0365034 A1* | 12/2014 | Schilling | G08C 17/02 701/2 |
| 2015/0032323 A1* | 1/2015 | Nijakowski | B60T 8/885 701/23 |
| 2015/0088360 A1* | 3/2015 | Bonnet | B60W 30/06 701/23 |
| 2015/0279210 A1* | 10/2015 | Zafiroglu | G08G 1/168 340/932.2 |

FOREIGN PATENT DOCUMENTS

| | | |
|---|---|---|
| DE | 102008051982 | 6/2009 |
| KR | 20010057645 | 7/2001 |

* cited by examiner

VEHICLE AND METHOD OF CONTROLLING

BACKGROUND OF THE INVENTION

With an increase in government regulations directed towards reducing pollution and increasing vehicle fuel economy, many automotive manufacturers and suppliers are focusing on improvements and advancements in fuel-saving technologies. One area of advancement has manufacturers coupling a small electric motor to an internal combustion engine of a vehicle to create a mild hybrid vehicle. Mild hybrid vehicles generally function like standard hybrid vehicles, with the capability of regenerative braking; however, although the electric motor may supplement the power supplied by the internal combustion engine, the electric motor cannot power the vehicle by itself such that there is no exclusive electric-only mode of driving.

Vehicles may include a trailer hitch mounted to the rear of the vehicle, commonly embodied as a tow ball, tow hook, trailer loop, or towing pintle. Large trucks may also include an alternative trailer hitch, a fifth wheel, which is mounted in the bed of the truck. The trailer hitch aligns with a hitch coupler to tow various items including enclosed or open trailers, vehicles, and recreational campers, among others. In order to align a hitch with a hitch coupler, vehicles often must be precisely reversed by a vehicle operator with the aid of a second individual, a spotter, located near the rear of the vehicle to provide instructions to the driver.

SUMMARY OF THE INVENTION

The invention provides, in one aspect, a method of controlling a mild hybrid vehicle having an electric motor arranged to selectively output torque and to selectively operate as a generator to harvest electrical power during operation of an internal combustion engine of the mild hybrid vehicle. An interface is provided in a location accessible outside of the vehicle. The interface is configured to control non-driving movement of the mild hybrid vehicle. An input is received from a human operator via the interface. In response to the input, the mild hybrid vehicle moves solely under power of the electric motor of the mild hybrid vehicle.

The invention provides, in another aspect, a mild hybrid vehicle including an internal combustion engine and an electric motor arranged to selectively output torque and to selectively operate as a generator to harvest electrical power during operation of the internal combustion engine. An interface is located on or outside an exterior panel of the vehicle. The interface is configured to provide a signal to control operation of the electric motor. Solely the electric motor of the mild hybrid vehicle is configured to provide motive power to at least one driven wheel of the vehicle in response to the signal.

The invention provides, in yet another aspect, a method of controlling a mild hybrid vehicle to align a hitch of the mild hybrid vehicle to a hitch coupler. The mild hybrid vehicle is operated in a normal driving mode for continuous travel with access to full power from an internal combustion engine and an electric machine of the mild hybrid vehicle. An interface is located on or outside of an exterior panel of the mild hybrid vehicle. The interface is enabled from a non-operational state to establish a communication relationship whereby a human input to the interface is transmitted to control operation of the electric motor, and enabling the interface transitions operation of the mild hybrid vehicle from the normal driving mode to a non-driving mode in which the mild hybrid vehicle is limited to receiving motive power solely through the electric motor. The electric motor is operated in response to the human input to the interface to move the mild hybrid vehicle in the non-driving mode until the hitch is aligned with the hitch coupler. The interface is disabled.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
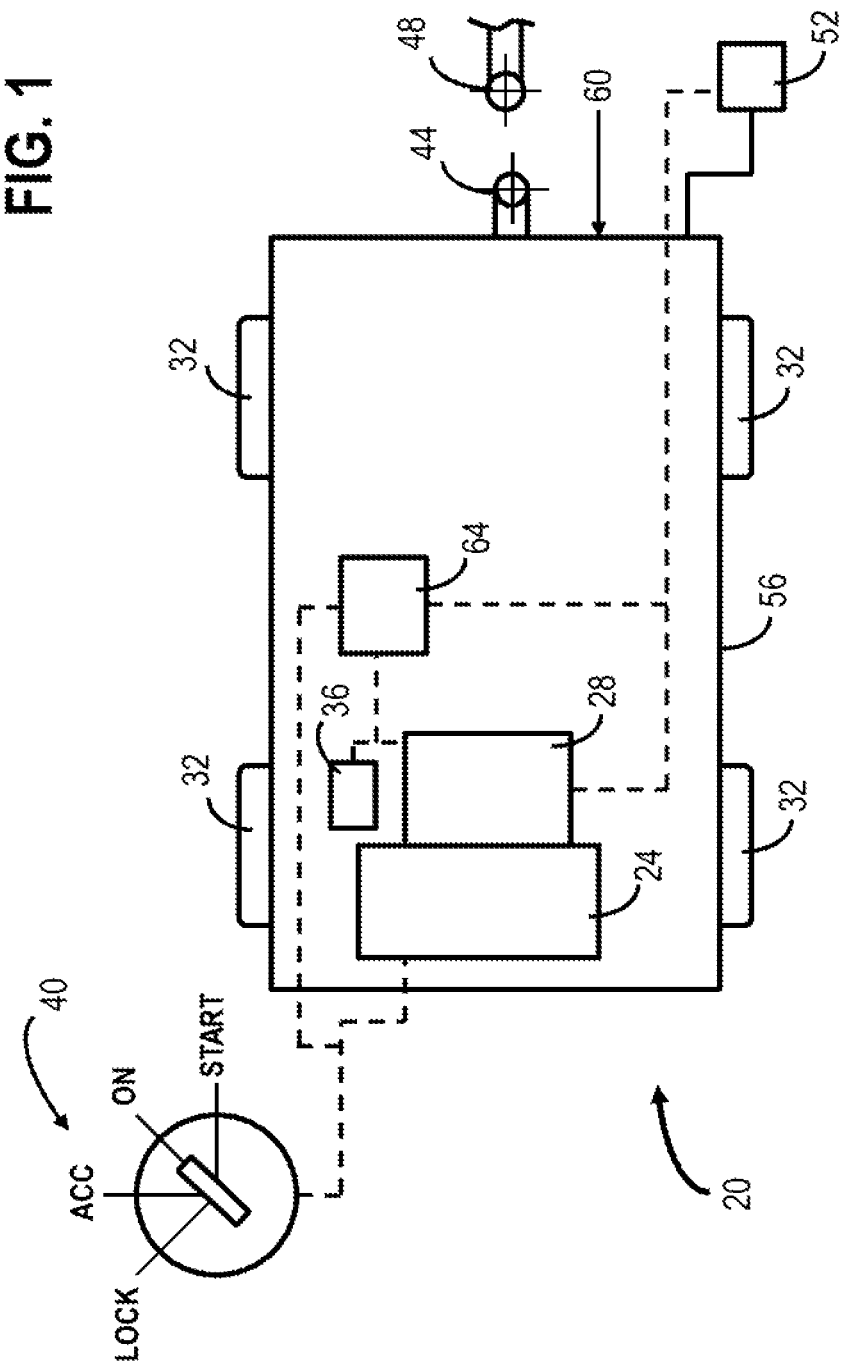
FIG. 1 is a top schematic view of a vehicle with a hitch and an interface, and a hitch coupler.

FIG. 1 illustrates a vehicle 20 with a mild hybrid powertrain including an internal combustion engine 24 and an electric motor 28. The electric motor 28 is an electric machine operable not only as a motor to convert stored electrical energy into rotation or torque, but also selectively operable as a generator to harvest electrical power in the presence of kinetic energy (e.g., wheel rotation). The internal combustion engine 24 is configured to provide motive power to at least one wheel 32 when the vehicle 20 is driven. The vehicle 20 includes four wheels 32 as illustrated, but alternative numbers of wheels are optional in other configurations. One or more of the wheels 32 can be driven wheels (e.g., front-wheel drive, rear-wheel drive, all-wheel drive, etc.). The electric motor 28 is electrically connected to a battery 36 and can optionally supplement the internal combustion engine 24; however, although the electric motor 28 may supplement the power supplied by the internal combustion engine 24, the electric motor 28 cannot power the vehicle 20 by itself such that the vehicle 20 cannot be driven solely by the electric motor 28. In some constructions, the electric motor 28 is provided as a starter/generator operable to start the internal combustion engine 24 from a non-operational state. The electric motor 28 can be integrated with the internal combustion engine 24 (e.g., an integrated starter/generator), or the motor 28 may be a separate component attachable and removable from the internal combustion engine 24. Whether integrated or not, the internal combustion engine 24 and the electric motor 28 can be directly, mechanically connected such that a crankshaft of the internal combustion engine 24 must rotate at all times the electric motor 28 operates. As opposed to connecting the electric motor 28 to the wheels 32 through the internal combustion engine 24, the electric motor 28 may be connected to the wheels 32 via alternative mechanical components of the drive train, downstream of the internal combustion engine 24. For example, the electric motor 28 can be provided at, and optionally integrated with, one of a gearbox, an axle, or a driveshaft of the vehicle 20.

The internal combustion engine 24 is electronically connected to an ignition control 40. The ignition control 40 is a user-operable input device configured to activate the electrical systems of the vehicle 20. The ignition control 40 is configured to transition between various modes. As shown in FIG. 1, the ignition control 40 may be embodied as a keyed ignition switch with a LOCK-mode, an ACCESSORIES-mode, an ON-mode, and a START-mode.

The LOCK-mode permits a key to be removed from the ignition control 40. The START-mode is a temporary mode that activates a starter motor solenoid, which enables the internal combustion engine 24 to crank and start. The START-mode is only activated while pressure is applied by a user. Once the user pressure is removed, the ignition control 40 rests in the ON-mode. When in the ON-mode, the internal combustion engine 24 is allowed to operate in a normal driving mode for continuous travel with access to the full complement of power from the internal combustion engine 24 and the electric motor 28 when requested by the operator or "driver" of the vehicle 20. Alternative to the keyed ignition switch, the ignition control 52 may be embodied as a push-start ignition device (e.g., pressable button or other toggle device).

The vehicle 20 further includes a hitch 44. The hitch 44 is shown as a tow ball, a sphere extending from a post and connected to the chassis of the vehicle 20. The hitch 44 is configured to be received by a hitch coupler 48, featuring a cup-shaped portion. The hitch 44 can alternatively be embodied as a tow hook, trailer loop, or towing pintle, among other hitch designs. In order to attach the hitch 44 to the hitch coupler 48, the hitch 44 and the hitch coupler 48 must be aligned such that the two can be linked with one another. For example, the tow ball must be vertically aligned with the hitch coupler 48 such that the cup-shaped portion is placed directly above the spherical tow ball for subsequent attachment.

Figure 2:
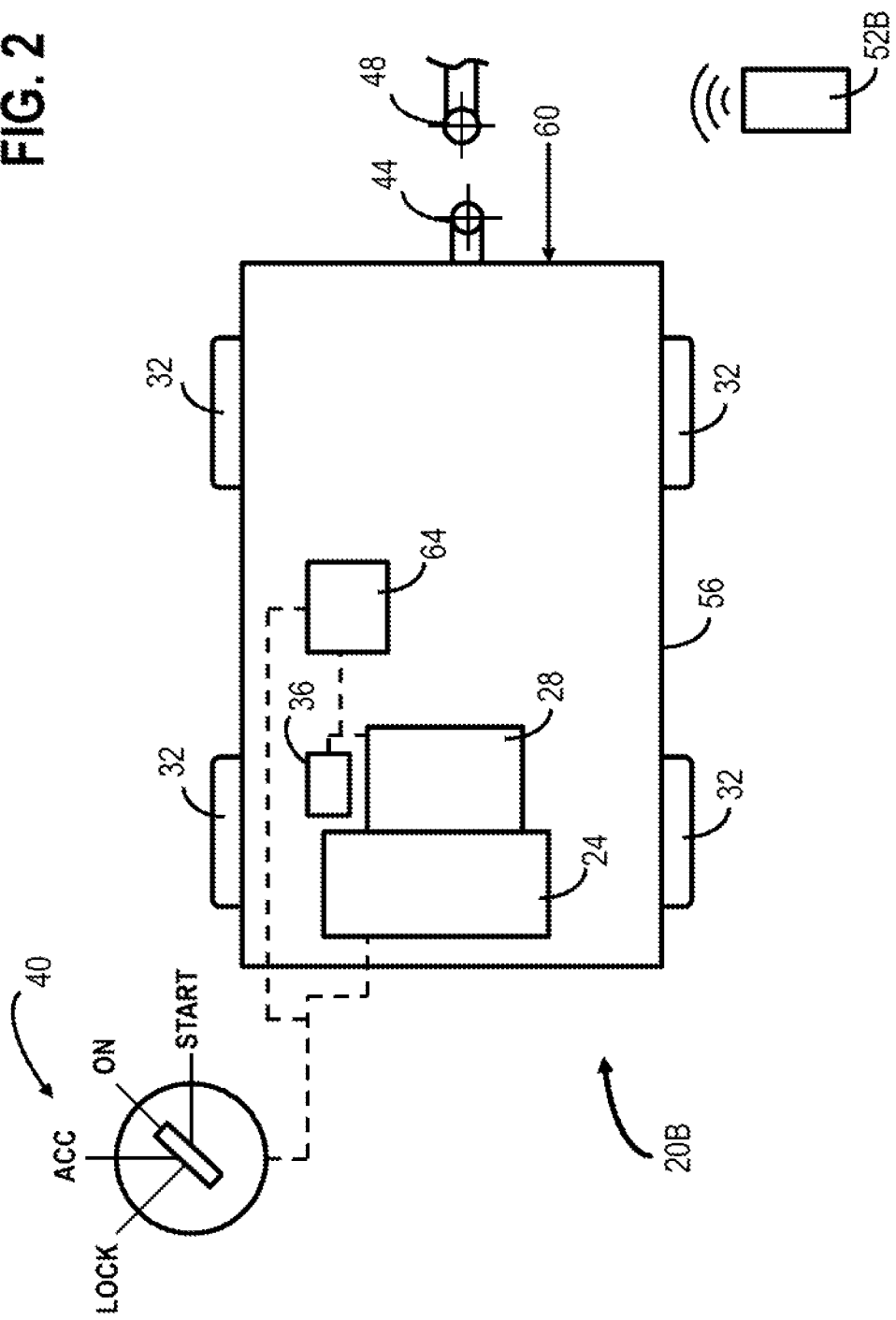
FIG. 2 is a top schematic view of a vehicle with a hitch and a wireless interface, and a hitch coupler.

An interface 52 is provided on or outside of an exterior panel 56 (e.g., body panel, bumper, truck bed or tailgate, etc.) of the vehicle 20. The interface 52 may be fully exposed to the outside environment, may be at least partially concealed, or may toggle between an exposed position and an at least partially concealed position. The interface 52 may contain physical inputs such as buttons, toggles, switches, etc. Additionally or alternatively, the interface 52 may include capacitive or pressure sensitive inputs such as touch screens and trackpads. Further still, the interface 52 may include input devices that measure non-physical contact such as voice or gesture recognition. The interface 52 may be physically connected (e.g., integrally fixed or tethered) to the exterior panel 56 of the vehicle 20. The interface 52 is electrically connected to provide a signal to control operation of the electric motor 28 only when selectively enabled by a controller 64. Alternatively, as shown in FIG. 2, a vehicle 20B is provided with a wireless interface 52B, which is similar to the interface 52, but configured to communicate wirelessly with the vehicle 20B (e.g, with the controller 64 via a receiver, not shown) to control operation of the electric motor 28. Although not shown, the controller 64 can also be coupled to a steering assembly of the vehicle 20, 20B so that steerable wheels 32 of the vehicle 20, 20B can be maneuvered via the interface 52, 52B.

Figure 3:
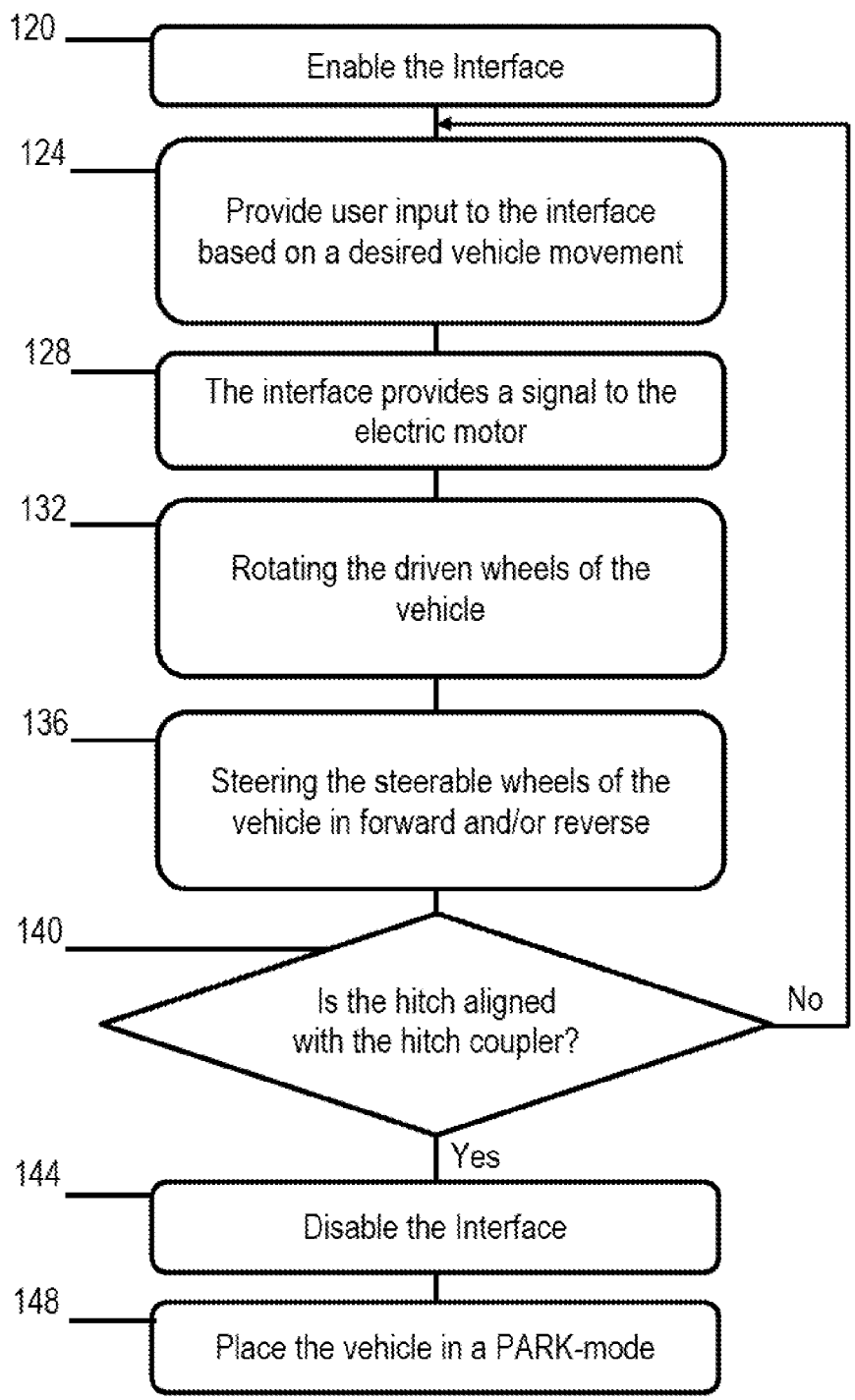
FIG. 3 is a flowchart depicting a method of controlling the vehicle of FIG. 1 or FIG. 2 to align the hitch with the hitch coupler.

FIG. 3 is a flowchart depicting a method of aligning the hitch 44 and the hitch coupler 48 of FIGS. 1-2. With respect to FIG. 3, reference will be made to the reference numerals of FIG. 1; however, the method of FIG. 3 also applies to the vehicle 20B of FIG. 2. The operator is located outside of the vehicle 20 and near the rear end 60 of the vehicle 20, in position to view the hitch 44 and the hitch coupler 48. The interface 52 is enabled in step 120. This may include removing the key from the ignition control 40 and inserting the key into the interface 52. Alternatively, to ensure operation by an authorized operator, the interface 52 may contain a number of buttons (e.g., physical buttons, buttons on a screen, etc.) that need to be actuated in a specific sequence. Further still, a voice command may be recognized by the controller 64 to enable the interface 52. Alternative input methods can also be used in conjunction with the interface 52. In response to the specified enabling action, the controller 64 establishes an electric connection between the interface 52 and the electric motor 28 whereby operation of the electric motor 28 is controlled solely in response to inputs from the interface 52.

The vehicle 20 is operable in a non-driving mode when the interface 52 is enabled. The internal combustion engine 24 is disabled and the vehicle 20 is solely moved by the electric motor 28 in the non-driving mode. The non-driving mode is a mode in which the vehicle 20 is limited to less than the vehicle's full capability in normal driving. In the limited, non-driving mode, movement of the vehicle 20 can be limited in total allowable travel (1 driven wheel rotation, 1 length of the vehicle, etc.), a maximum speed (e.g., less than 1 mile per hour, 10 driven wheel rotations per minute, etc.), or both.

Once the interface 52 is enabled, the operator provides an input to the interface 52, based on a desired vehicle movement, at step 124. For example, if the operator determines that the vehicle 20 must reverse to align the hitch 44 with the hitch coupler 48, the input may include user contact with a directional arrow on the interface 52 pointing towards the rear end 60 of the vehicle 20. The input informs the interface 52 to provide a signal to the electric motor 28 at step 128. If the vehicle 20 includes a wireless interface 52B, the wireless interface 52B provides a wireless signal to control operation of the electric motor 28. In response to the signal, the electric motor 28 moves the vehicle 20 in the non-driving mode. The movement of the vehicle 20 achieved by the electric motor 28 in the non-driving mode can include rotating the driven wheels 32 of the vehicle 20 in forward and/or reverse at step 132, as well as optionally steering the steerable wheels 32 of the vehicle 20 at step 136.

At step 140, the operator inspects whether the hitch 44 is aligned with the hitch coupler 48. If the hitch 44 is not aligned with hitch coupler 48, the method returns to step 124, and an additional input is provided to the interface 52 by the operator. Once the hitch 44 is aligned with the hitch coupler 48, the interface 52 is disabled at step 144. Disabling the interface 52 may include undoing the action which enabled the interface 52 in step 120. The key may be removed from the interface 52, a button or switch may be pressed or toggled, or a voice or gesture command may disable the interface 52. The vehicle 20 is then placed in a PARK-mode, either automatically or by the operator, in step 148 to prevent further movement of the vehicle 20.

The process of aligning a hitch with a hitch coupler conventionally requires a vehicle operator and a spotter located outside of the vehicle. The spotter stands in view of both the hitch and the hitch coupler, and communicates with the vehicle operator to provide directions and distances to accurately align the hitch with the hitch coupler. This process requires two individuals and the vehicle operator must translate the instructions of the spotter into depressions of a pedal and turns of a steering wheel. Although autonomous vehicle control has been in recent development and could be adapted for fully automated alignment of a hitch with a hitch coupler, autonomous control technology is in its infancy and would be impractical to implement in a modern vehicle that still requires driver operation during normal driving, due to complexity and cost. To the contrary, the invention can transform an existing mild hybrid vehicle, with minimal additional cost and hardware, to efficiently provide an entirely new mode of operation that provides an additional useful feature by taking advantage of the electric machine in the mild hybrid powertrain to function outside of its primary design function.

What is claimed is:

1. A method of controlling a mild hybrid vehicle with an electric motor arranged to selectively output torque and to selectively operate as a generator to harvest electrical power during operation of an internal combustion engine of the mild hybrid vehicle, the method comprising:
   providing an interface accessible from a location outside of the vehicle and configured to control non-driving mode movement of the mild hybrid vehicle;
   receiving an input from a human operator via the interface; and
   in response to the input, moving the mild hybrid vehicle in the non-driving mode solely under power of the electric motor.

2. The method of claim 1, further comprising:
   providing a hitch attached to the mild hybrid vehicle,
   wherein moving the mild hybrid vehicle solely under power of the electric motor includes aligning a hitch coupler with the hitch.

3. The method of claim 1, further comprising steering the mild hybrid vehicle in response to the input to the interface.

4. The method of claim 1, wherein the mild hybrid vehicle further includes an ignition control, the method further comprising enabling the interface from a non-operational state in response to the removal of a key from the ignition control.

5. The method of claim 4, wherein the interface is integral with or connected to the exterior of the mild hybrid vehicle, the method further comprising placing the key in the interface prior to activating the interface.

6. The method of claim 1, wherein the interface is separate from the exterior of the mild hybrid vehicle, and prior to moving the mild hybrid vehicle solely under power of the electric motor, the method further including transmitting a wireless signal from the interface.

7. The method of claim 1, wherein moving the mild hybrid vehicle solely under power of the electric motor includes rotating a crankshaft of the internal combustion engine with the electric motor while the internal combustion engine is not operating.

8. A mild hybrid vehicle comprising:
   an internal combustion engine;
   an electric motor arranged to selectively output torque and to selectively operate as a generator to harvest electrical power during operation of the internal combustion engine; and
   an interface located on or outside of an exterior panel of the vehicle and configured to provide a signal to control operation of the electric motor,
   wherein solely the electric motor of the mild hybrid vehicle is configured to provide motive power to at least one driven wheel of the mild hybrid vehicle in response to the signal.

9. The mild hybrid vehicle of claim 8, wherein the interface is further configured to steer at least one driven wheel of the mild hybrid vehicle.

10. The mild hybrid vehicle of claim 8, wherein the interface is separate from the exterior panel of the mild hybrid vehicle and is configured to provide a wireless signal to control operation of the electric motor.

11. The mild hybrid vehicle of claim 8, wherein the electric motor is an integrated starter-generator.

12. The mild hybrid vehicle of claim 8, wherein the interface is positioned on the exterior panel of the mild hybrid vehicle at a rear side of the mild hybrid vehicle.

13. A method of controlling a mild hybrid vehicle to align a hitch of the mild hybrid vehicle with a hitch coupler, the method comprising:
   operating the mild hybrid vehicle in a normal driving mode for continuous travel with access to full power from an internal combustion engine and an electric motor of the mild hybrid vehicle;
   providing an interface located on or outside of an exterior panel of the mild hybrid vehicle;
   enabling the interface from a non-operational state to establish a communication relationship whereby a human input to the interface is transmitted to control operation of the electric motor, wherein enabling the interface transitions operation of the mild hybrid vehicle from the normal driving mode to a non-driving mode in which the mild hybrid vehicle is limited to receiving motive power solely through the electric motor;
   operating the electric motor in response to the human input to the interface to move the mild hybrid vehicle in the non-driving mode until the hitch is aligned with the hitch coupler; and
   disabling the interface.

14. The method of claim 13, further comprising steering the mild hybrid vehicle in response to the human input to the interface.

15. The method of claim 13, wherein the mild hybrid vehicle further includes an ignition control, the method further comprising enabling the interface in response to removal of a key from the ignition control.

16. The method of claim 15, wherein the interface is integral with or connected to the exterior of the mild hybrid vehicle, the method further comprising placing the key in the interface prior to activating the interface.

17. The method of claim 13, wherein the interface is separate from the exterior of the mild hybrid vehicle, and prior to operating the electric motor in the non-driving mode, the method further including transmitting a wireless signal from the interface.

18. The method of claim 13, wherein operating the electric motor in the non-driving mode includes rotating a crankshaft of the internal combustion engine with the electric motor while the internal combustion engine is not operating.

* * * * *